United States Patent [19]
Cogat

[11] Patent Number: 5,653,163
[45] Date of Patent: Aug. 5, 1997

[54] APPARATUS FOR PROCESSING HYDRATED BIOLOGICAL MATERIALS

[76] Inventor: Pierre Olivier Cogat, 27 Rue des Bénards, 92260 Fontenay aux Roses, France

[21] Appl. No.: 632,471
[22] PCT Filed: Aug. 11, 1994
[86] PCT No.: PCT/FR94/01297
  § 371 Date: Jun. 13, 1996
  § 102(e) Date: Jun. 13, 1996
[87] PCT Pub. No.: WO95/12992
  PCT Pub. Date: May 18, 1995

[30] Foreign Application Priority Data

Nov. 8, 1993 [FR] France .................... 93 13286

[51] Int. Cl.$^6$ ........................................ A23B 7/00
[52] U.S. Cl. ........................ 99/470; 99/472; 99/477; 99/483; 422/26; 422/307
[58] Field of Search ................. 99/467, 468, 477–479, 99/483, 484, 485, 348, 470, 473, 516, 517, 534; 422/292–309, 26–30

[56] References Cited

U.S. PATENT DOCUMENTS

| 2,692,200 | 10/1954 | Olson | 99/477 |
| 3,131,738 | 5/1964 | Hind | 99/483 |
| 4,147,098 | 4/1979 | Witte | 99/477 |

FOREIGN PATENT DOCUMENTS

| 464080 | 2/1974 | Australia . |
| 2342670 | 9/1977 | France . |
| 2400851 | 3/1979 | France . |
| 2490502 | 3/1982 | France . |
| 2542169 | 9/1984 | France . |
| 2638333 | 5/1990 | France . |
| 2656547 | 7/1991 | France . |

*Primary Examiner*—Timothy F. Simone
*Attorney, Agent, or Firm*—Harris Beach & Wilcox, LLP

[57] ABSTRACT

An apparatus extracts juices and flavors from hydrated biological materials without adding exogenous water during operation. The apparatus uses steam produced from the water inherently present in the hydrated biological materials themselves.

9 Claims, 5 Drawing Sheets

APPARATUS FOR PROCESSING HYDRATED BIOLOGICAL MATERIALS

BACKGROUND OF THE INVENTION

1. Field of the Invention

The invention relates to the treatment of hydrated biological materials, and more precisely to the field of the extraction of juices and flavors from various plant substrates such as fruits, vegetables or other leaves. It relates in particular to a plant in which there is no need to add exogenous water in order to heat or blanch said materials.

2. Description of the Prior Art

In the Applicant's document FR-A-2 656 547 a continuous apparatus was provided for deaerating, heating, maintaining at temperature and cooling under vacuum solid organic materials. This plant chiefly comprises a heating chamber into which steam is injected at high temperature to produce the heating of the material to be treated. This heated material is subsequently transferred to a decompression chamber in which a pressure lower than 0.1 bar prevails and where the vaporization of the water present within the material to be treated takes place. A solid material is thus obtained which is lighter and suited to being treated either by pressurizing or by another means of conditioning. This plant gives full satisfaction but has the disadvantge of requiring the injection of exogenous steam in order to heat the material to be treated. This addition of steam entails a phenomenon of dilution of the material to be treated, which dilution must be compensated by an additional concentration stage. The need for a concentrating device makes the plant more complicated as a whole and reduces the economic advantage of this plant. Furthermore, the addition of exogenous steam is generally prohibited, especially in viticulture or for obtaining fruit juice known as "pure juice".

A plant relating more particularly to the treatment of perfumed and condimental plants requiring a number of extractions was proposed in document FR 2 638 333. This plant enables a number of extractions to be carried out on the same substrate with a single set of equipment, but has the disadvantage of operating noncontinuously, and above all, of requiring an exogenous steam source.

SUMMARY OF THE INVENTION

The subject of the invention relates to a plant of the type in question, not exhibiting the above disadvantages.

It concerns a plant for the continuous treatment of hydrated biological materials including:

a means for delivering said materials, a steam heating chamber, in which the materials travel forward, a low-pressure decompression chamber for cooling the hot material originating from the heating chamber and vaporizing a proportion of the water present in the materials, said decompression chamber being connected, respectively, to the heating chamber by a means capable of maintaining a pressure difference between the two chambers, and to a condenser which is in turn connected to a vacuum source, characterized in that it includes:

means for recovering the hot condensates and exudates formed in the heating chamber;

means for heating and vaporizing these hot condensates and exudates;

and means for delivering and injecting into the heating chamber the condensate and exudate originating from these means for vaporizing.

In other words, the invention consists of recovering the steam condensates and a proportion of the liquid exuding from the material when it is being heated in the heating chamber and then in heating and vaporizing this recovered liquid in order to return it in the form of steam into the heating chamber. Thus the steam used for the heating originates directly from the material and the use of external water which does not form part of the raw material is avoided.

In a practical embodiment the heating chamber includes at least one helical screw rotatable around a shaft and intended to propel the material forward, surrounded near the bottom by a perforated component such as a grid intended to collect the hot condensates and exudates as it is formed in order to deliver it into the means of recovery, said rotary shaft adopting the form of a pipe connected at its entry end to the means for delivering the exudate vapors, and pierced at the periphery with a plurality of orifices intended to inject the exudate vapors into the heating chamber in the vicinity of the materials which are traveling forward.

In other words, the material to be treated in the heating chamber is driven by an Archimedes' screw and the steam injected onto this material originates, on the one hand, from the periphery of the screw through a grid, and on the other hand, via the center of the screw. This ensures penetration of the steam to the very core of the material.

Advantageously, in practice, the means for heating and vaporizing the hot condensates and exudates consists of a downward-flow surface exchanger with a small difference in temperature.

The flow time of the condensates and exudates is greatly reduced by employing a downward-flow exchanger. Furthermore, the use of an exchanger with a small difference in temperature between the heat source and the exudates to be heated makes it possible to avoid phenomena of calcination and of deposition resulting in cooked flavors.

In a practical embodiment the plant also includes:

means for extracting the treated material from the decompression chamber in order to deliver it to a press intended to separate the solid materials and the pressed juice;

and means for, as needed, either extracting this juice or delivering it into the circuit for recovery of the hot condensates and exudates upstream of the exchanger.

In this way it is possible to recover the juice originating from the pressing, conveying it to the exchanger so as to vaporize it partially in order to inject the steam emitted into the heating chamber. In this embodiment the steam used for the heating originating from the juice ensures a preconcentration of this juice.

Advantageously, in practice:

the means for delivering the juice into the circuit for hot condensates and exudates includes a recovery tank into which emerge said condensates-exudates and the juice, and a pump for transferring the mixture contained in the recovery tank toward the exchanger;

the circuit for hot exudates includes two valves intended, as needed, either to remove directly a proportion of these condensates-exudates, or to convey these condensates-exudates toward the recovery tank;

the plant also includes means making it possible, as needed, either to extract the liquid condensates-exudates originating from the exchanger or to deliver them to the decompression chamber; and the plant also includes means making it possible, as needed, either to extract the aromatic condensates produced by the decompression under vacuum and originating from the condenser, or to deliver them to the decompression chamber.

In a practical embodiment the decompression chamber includes, in this order, from the bottom upward:

a cylindrical top portion connected to the condenser of the low pressure-drop type for the treated vapors, this cylindrical part having an appreciable section in order to avoid the entrainment of the heated materials originating from the heating chamber;

a middle portion including a succession of parallel grids through which the vapors pass, and then a delivery of the material originating from the heating chamber;

and a narrow frustoconical bottom portion on the walls of which the material slides.

BRIEF DESCRIPTION OF THE DRAWINGS

The method of carrying out the invention and the advantages which stem therefrom will appear clearly from the description of the following embodiment, in support of the attached figures.

DESCRIPTION OF THE PREFERRED EMBODIMENT(S)

Figure 1:
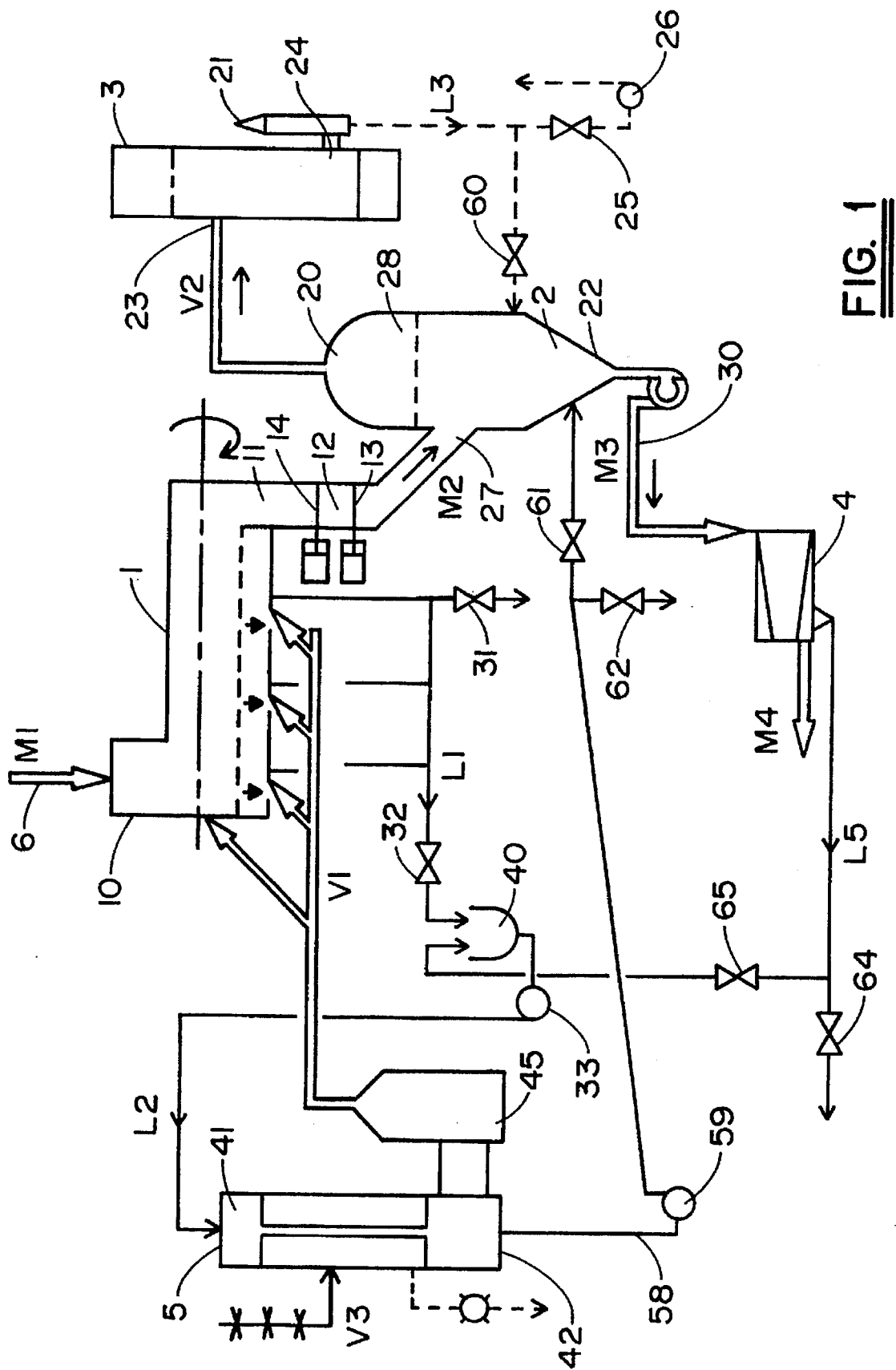
FIG. 1 is a general plan of the plant.

As a whole, as shown in FIG. 1, the plant includes a heating chamber (1), a decompression chamber (2), a condenser (3), a press (4), an exchanger (5) and a whole series of pipes and pumps and valves capable of bringing these components into communication with each other.

The conveying of the material (M1) to be treated into the heating chamber is done by conventional means of delivery (6). These may be a belt for conveying whole fruits, or pumps for feeding the heating chamber with small berries. These means (6) of delivery avoid rubbing and spoiling of the fruits.

The heating chamber (1) is of elongate cylindrical shape, with the delivery of the material (M1) taking place at one end of the cylinder and the discharge through the opposite end (11). The exit (11) of the heating chamber (1) is connected to the decompression chamber (2) by an air lock (12) which makes it possible to maintain the pressure difference between the heating chamber (1), which is at atmospheric pressure, and the decompression chamber (2), which is at reduced pressure, typically between 0.1 and 0.03 bar. This air lock (12) may consist of two guillotines (13, 14) as shown in FIG. 1, or may be replaced in an equivalent manner with a positive delivery pump.

The top part (20) of the decompression chamber (2) is connected to a condenser (3), itself connected to a vacuum pump (21). The decompression chamber (2) is intended to receive, by gravitation, the material (M2) originating from the heating chamber (1). The lower end (22) of the decompression chamber (2) is connected to a circuit (30) for pressing the material (M3) to be treated. The condenser (3), of the surface or mixture type, is characterized by low pressure drops for steam flow. The vapors (V2) drawn in enter the condenser (3) via its top part (23) and are drawn out via the bottom part (24). Furthermore, the condensed liquid (L3) is collected in a circuit permitting either extraction by means of the valve (25) and of the pump(26) or their return to the bottom of the decompression chamber (2). In the middle portion, above the delivery (27) of material originating from the heating chamber (1), the decompression chamber (2) comprises a series of parallel grids (28), through which the vapors (V2) pass.

The pressing circuit consists chiefly of a press (4), the type of which depends on the material and specially on the fruits to be treated. This press (4) allows the pressed solid materials (M4) to be separated from a press juice (L5) which may be either stored with a view to its subsequent use or reemployed according to a characteristic of the invention.

Figure 5:
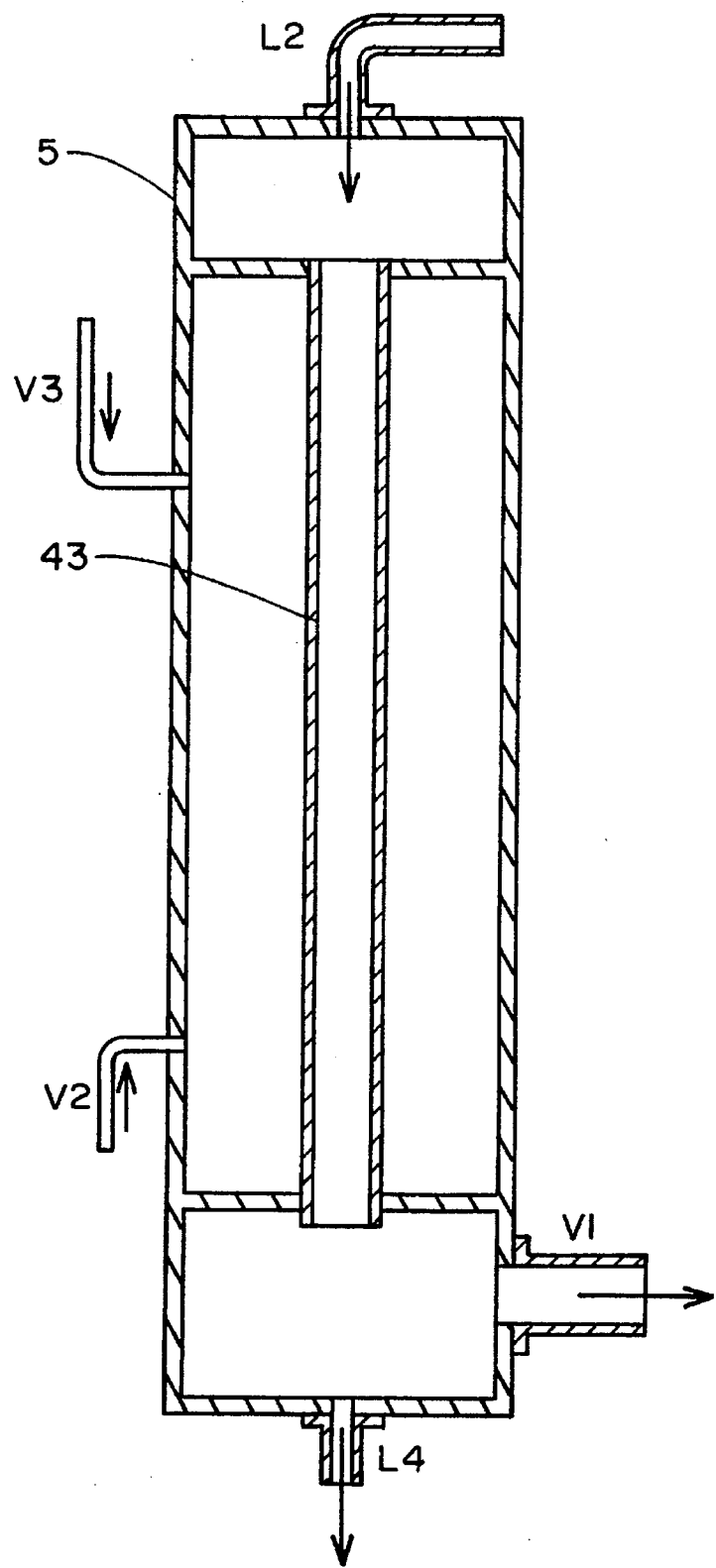
FIG. 5 is a sectional view of the exchanger.
Figure 6:
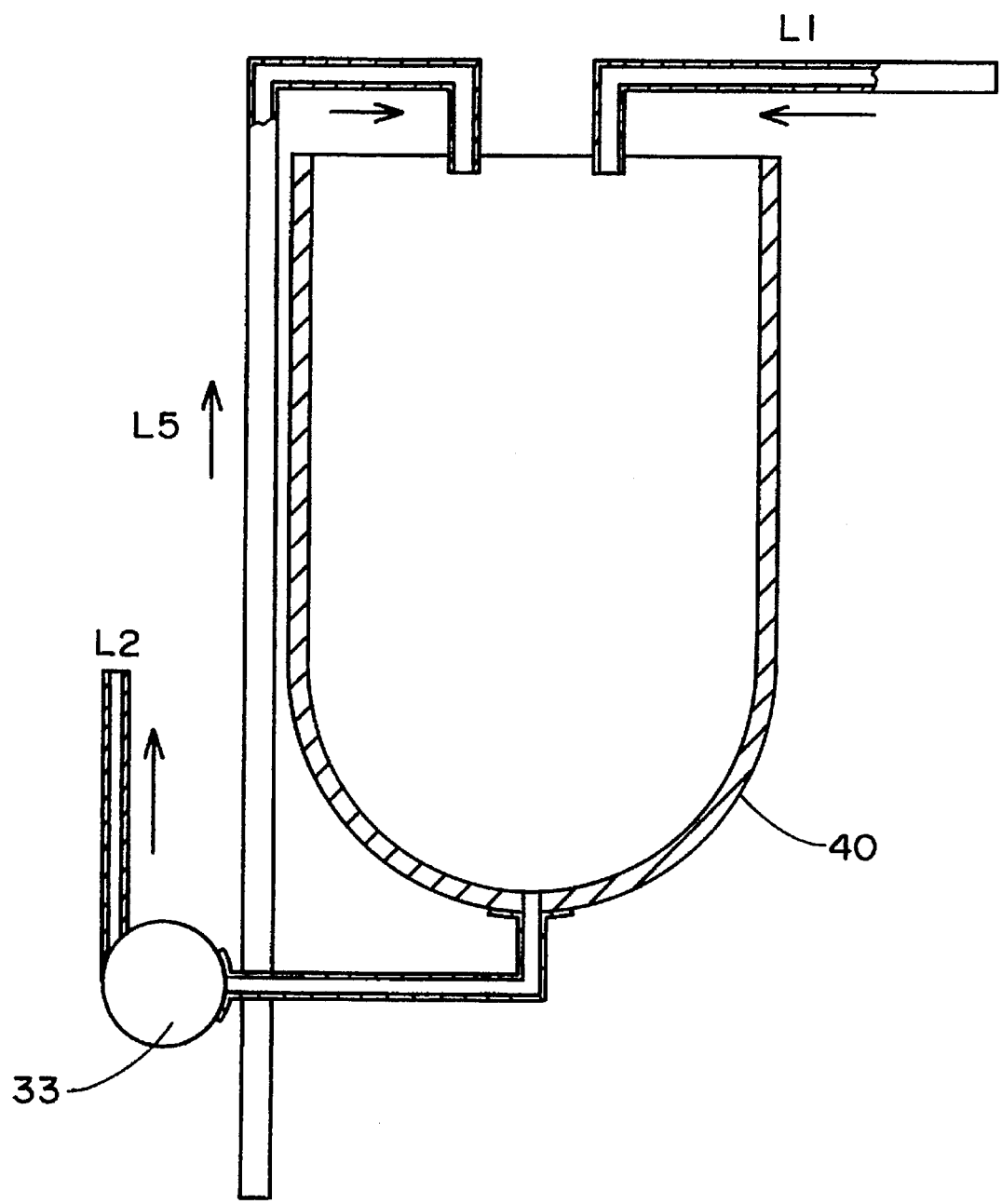
FIG. 6 is a view of detail of the recovery tank.

The main characteristic of the invention lies in the fact that the steam (V1) employed in the heating chamber (1) is obtained directly from the material (M1) being treated. In accordance with the invention the heating chamber comprises means for harvesting the condensates-exudates L1 from the heated material (M1), that is to say the liquid exuding as a result of the conveying and heating of this material (M1). When these condensates-exudates (L1) have been recovered, they are either simply removed via the valve (31) or conveyed toward a recovery tank (40) via the valve (32). This recovery tank (40) is connected by means of a pump (33) to an exchanger permitting the vaporization of these condensates-exudates (L1). As shown in FIG. 5, the exchanger (5) employed is of the downward-flow type, that is to say that the liquid (L1) to be heated comes in via the top part (41) of the exchanger (5) and flows as far as the base (42) of said exchanger (5). This liquid (L2) trickles down the inner walls (43) of the exchanger (5), which walls (43) are in contact with a source of heat, typically a secondary steam (V3) originating from a conventional boiler.

According to another characteristic of the invention, the temperature difference between the liquid (L2) and the secondary steam (V2) is small, typically of the order of 5° to 10° C., in order to prevent the exudates (L2) from depositing, adhering to the walls (43) and then being calcined, subsequently resulting in the deterioration of the heat exchangers. The base (42) of the heat exchanger is connected to a cyclone (45) intended to separate the liquid exudates (L4) from the vaporized exudates L1 and to direct this steam (V1) to the heating chamber (1).

Figure 2:
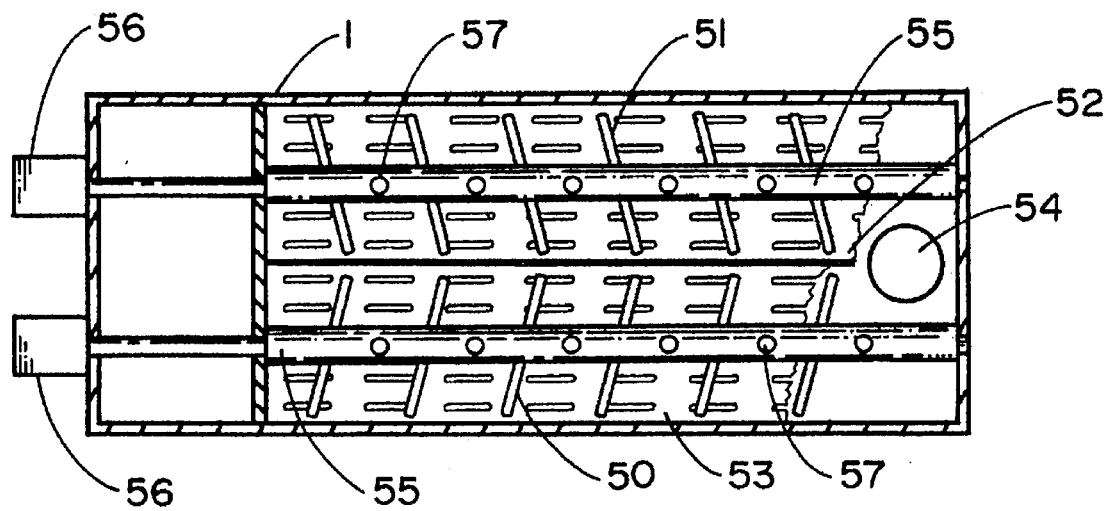
FIG. 2 is a sectional view of the heating chamber seen from above.
Figure 3:
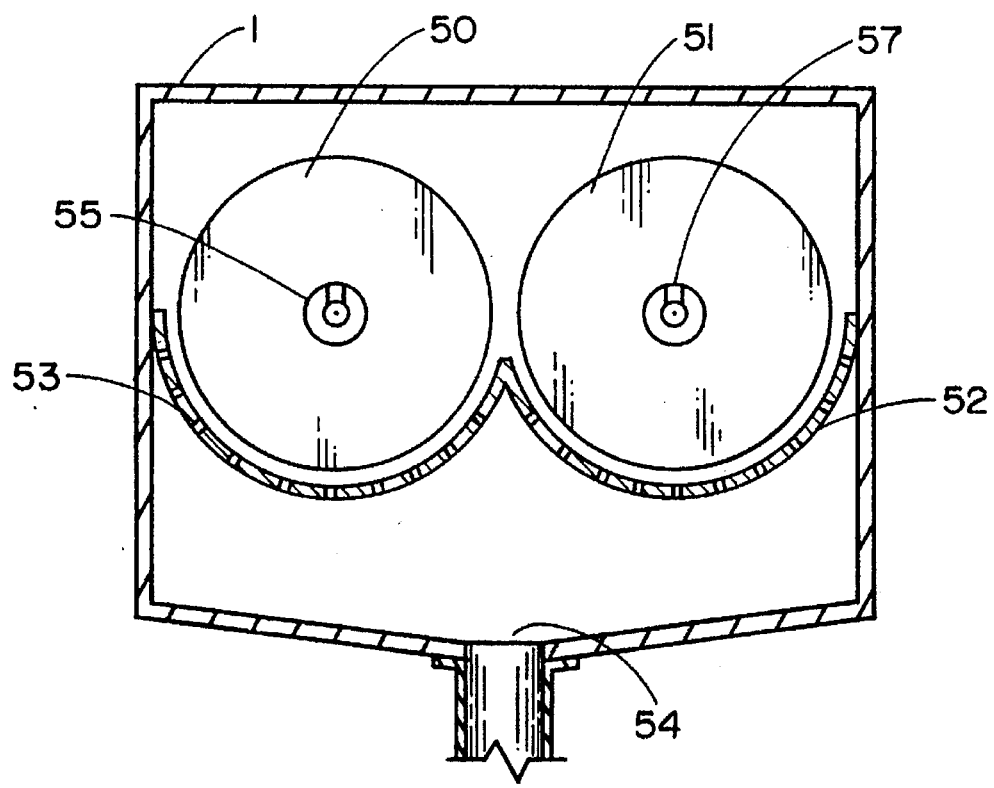
FIG. 3 is a sectional view of the heating chamber seen from the side.
Figure 4:
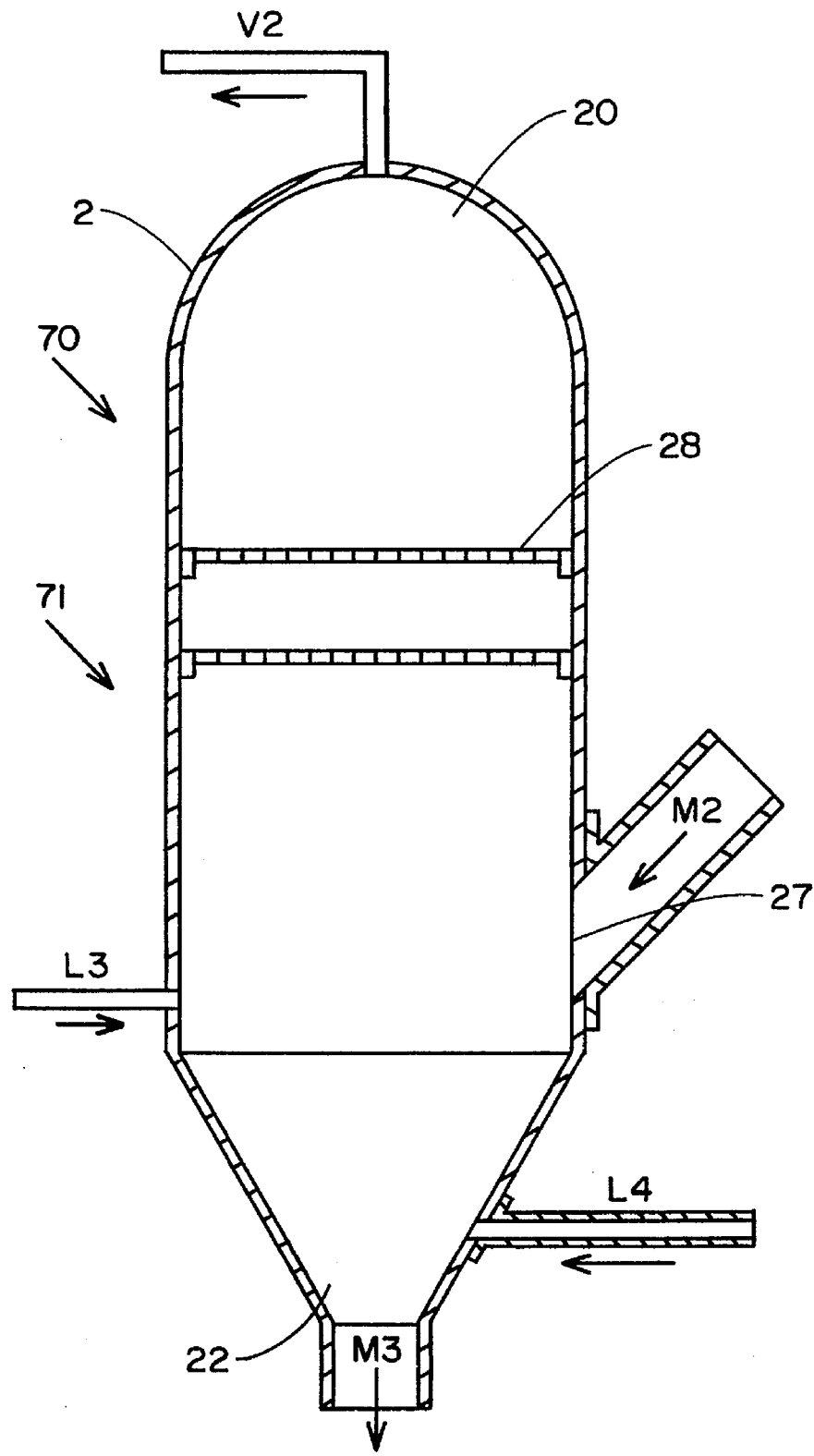
FIG. 4 is a sectional view of the decompression chamber.

In practice, as shown in FIGS. 2 and 3, the heating chamber (1) includes two Archimedes' screws (50, 51) with opposite pitches, driving the material (M1) forward from one end (10) to the other (11). Each of these screws (50, 51) rotates inside a perforated half-cylinder (52, 53) through which the exudates (L1) flow, from the material (M1) toward the bottom (54) of the heating chamber (1), and through which the condensate-exudate vapors (V1) originating from the exchanger (5) rise in the direction of the material (M1) to be heated. In parallel, the shaft (55) of each screw (50, 51) is connected to the delivery (56) of steam (V1) originating from the exchanger (5). Each shaft (55) is pierced with a multitude of orifices (57) through which the steam (V1) is injected in the direction of the material (M1). In this way the steam (V1) penetrates to the core of the material (M1) to be treated.

In an alternative form the exchanger (5) and the cyclone (45) are equipped with a pipe (58) and a pump (59) which can extract the unvaporized exudates (L4) or convey them toward the decompression chamber (2).

The following examples show the use of the plant for fruits of different types.

EXAMPLE 1

To obtain a juice from easily pressable fruits, in contrast to fruits which have a shell or a high fiber content, the plant is employed in the following manner.

In the heating chamber (1) the condensates-exudates L1 which are obtained are vaporized in the exchanger (5) and are then reinjected into the heating chamber to produce the rise in temperature. The flow of the heated material into the decompression chamber causes the vaporization of approximately 10% of the mass of water present in the heated fruits. To keep all of the initial water present in the fruits, the condensed vapors (V2) are next returned via the valve (60) into the bottom of the decompression chamber (2). In parallel, the condensates-exudates which are not vaporized (L4) in the exchanger (5) are also returned to the bottom of the decompression chamber (2) via the valve (61) and the pump (59).

Thus, in the pressing circuit (4) the material (M3) to be treated comprises the same proportion of water as the raw material (M1) conveyed into the heating chamber (1). The juice obtained (L5) can accordingly be described as pure juice.

EXAMPLE 2

In the case of a winemaking application, the plant can be used to increase the must concentration with the aim of raising the alcohol content of the wine. In this case the exudates (L1) are transferred onto the exchanger (5) through the tank (40) and the pump (33), the valve (32) being open and the valve (31) being closed. Similarly, the concentrated juice (L4) leaving the exchanger (5) is transferred toward the bottom of the decompression chamber (2) through the pump (59), the valve (61) being open and the valve (62) being closed. Finally, the vacuum condensates (L3) recovered at the exit of the condenser (3) are extracted via the valve (25) and the pump (26). As a result, the possible reduction in the volume of the vintage is estimated at approximately 12%.

It has been possible to obtain an increase in the alcohol content of one degree Gay-Lussac in this way.

EXAMPLE 3

A third configuration of the plant consists in performing a maximum preconcentration of a juice from pressing of the treated material. This technique is applicable particularly to fibrous raw materials which do not produce sugary exudates in the heating chamber (1), like pineapples.

In this case, the purely aqueous condensates (L1) issuing from the heating chamber (1) are removed via the valve (31) while the valve (32) is closed. In parallel, the exchanger (5) produces biological steam (V1) while being fed with the pressed juice L5 produced by the press (4) and passing through the tank (40) and the pump (33), the valve (64) being closed while the valve (65) is open. Similarly the vacuum condensates (L3) are transferred from the condenser (3) toward a storage tank through the pump (26), the valve (60) being closed and the valve (25) being open. Finally, the preconcentrated juice (L4) leaving the exchanger (5) is recovered by means of the pump (59), the valve (62) being closed and the valve (61) being open.

A preconcentration of approximately 25% of the pressed juice is obtained in this way.

The description given above relates to the extraction of juice from fruits, but it can also apply to any type of hydrated organic or biological materials, for example vegetables and aromatic plants.

From the description of the invention it clearly follows that the latter presents a number of advantages. On the one hand, it offers the possibility of concentration, as needed, that is to say of removing a proportion of the water present in the material to be treated. On the other hand it makes it possible, using a simple and efficient device, to heat the material to be treated using steam originating directly from said material, thereby enabling it to comply with the regulations relating to the prohibition of the introduction of exogenous water into fruit juices or grape harvests.

What is claimed is:

1. An apparatus for the treatment of hydrated biological materials, comprising:

means for delivering said materials, a steam heating chamber, in which the materials travel in a forward direction and become hot materials, a low-pressure decompression chamber for cooling the hot materials originating from the heating chamber and vaporizing a proportion of water present in the hot materials, said decompression chamber being connected to the heating chamber by a means capable of maintaining a pressure difference between the heating and decompression chambers and to a condenser which is in turn connected to a vacuum source, recovery means for recovering hot condensates-exudates formed in the heating chamber;

heating means for heating and vaporizing said hot condensates-exudates, and injection means for delivering and injecting into the heating chamber condensate-exudate vapors originating from said heating means.

2. Apparatus according to claim 1, wherein the heating chamber includes at least one helical screw rotatable around a shaft and intended to propel the material in said forward direction, said heating chamber surrounded near a bottom by a perforated component intended to receive the hot condensates-exudates as their are formed in order to deliver them into the recovery means, said shaft being pipe-shaped and connected at an entry end to the injection means, said heating chamber pierced at a periphery with a plurality of orifices intended to inject the condensate-exudate vapors into the heating chamber in a vicinity of the materials which are traveling in a forward direction.

3. Apparatus according to claim 2, the means for heating and vaporizing the hot condensates-exudates consists of a downward-flow exchanger such that a difference in temperature between said hot condensates-exudates and said condensate-exudate vapors is between about 5° C. and 10° C.

4. Apparatus according to claim 1 further including:

first extracting/delivery means for extracting treated material from the decompression chamber for delivery to a press for separating said treated material into solid material and pressed juice; and second extracting/delivery means for either extracting said juice or delivering it into a recovery circuit for recovering the hot condensates-exudates at a location upstream of the heating means.

5. Apparatus according to claim 4, the second extracting/delivery means includes a recovery tank into which emerge said condensates-exudates and the juice, and a pump for transferring a mixture contained in the recovery tank toward the heating means.

6. Apparatus according to claim 5, the recovery circuit includes first and second valves such that said first valve permits removing directly a proportion of said condensates-exudates and said second valve permits conveying said condensates-exudates toward the recovery tank.

7. Apparatus according to claim 6, said recovery circuit also includes third extracting/delivery means for either extracting the liquid condensates-exudates originating from the heating means or delivering them to the decompression chamber.

8. Apparatus according to claim 6, said recovery circuit also includes fourth extracting/delivery means for either extracting aromatic condensates produced by decompression under vacuum and originating from the condenser or delivering them to the decompression chamber.

9. Apparatus according to claim 8, wherein the decompression chamber includes, in this order, from the bottom upward:

a cylindrical top portion connected to the condenser of a low pressure-drop type, said cylindrical top portion being of a size sufficient to avoid entrainment of the hot materials originating from the heating chamber;

a middle portion including a succession of parallel grids through which the vapors pass, and a means for delivery of the hot materials originating from the heating chamber; and a narrow frustoconical bottom portion on which the hot materials slide downward.

* * * * *